United States Patent
Yoon

(10) Patent No.: US 11,336,884 B2
(45) Date of Patent: May 17, 2022

(54) CAMERA MODULE HAVING IMAGE SENSOR AND THREE-DIMENSIONAL SENSOR

(71) Applicant: SK hynix Inc., Gyeonggi-do (KR)

(72) Inventor: Seung Hyun Yoon, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/986,784

(22) Filed: Aug. 6, 2020

(65) Prior Publication Data
US 2021/0281817 A1 Sep. 9, 2021

(30) Foreign Application Priority Data
Mar. 5, 2020 (KR) .................. 10-2020-0027614

(51) Int. Cl.
  H04N 13/254 (2018.01)
  G01S 17/894 (2020.01)
  H04N 5/225 (2006.01)
  H04N 5/232 (2006.01)

(52) U.S. Cl.
  CPC ......... *H04N 13/254* (2018.05); *G01S 17/894* (2020.01); *H04N 5/2256* (2013.01); *H04N 5/23212* (2013.01)

(58) Field of Classification Search
  CPC .................................................. G01S 17/894
  USPC ........................................................ 348/46
  See application file for complete search history.

(56) References Cited

U.S. PATENT DOCUMENTS

| | | | |
|---|---|---|---|
| 9,007,439 B2 | 4/2015 | Banks | |
| 2016/0006914 A1 | 1/2016 | Neumann | |
| 2016/0061586 A1* | 3/2016 | Broga | H04N 5/232939 348/140 |
| 2019/0072253 A1* | 3/2019 | Mouri | F21S 41/657 |
| 2020/0397269 A1* | 12/2020 | Miyata | G06T 7/11 |
| 2021/0018822 A1* | 1/2021 | Nakamura | H04N 9/3161 |

FOREIGN PATENT DOCUMENTS

WO 2011-102025 8/2011

* cited by examiner

Primary Examiner — Amir Shahnami
(74) Attorney, Agent, or Firm — IP & T Group LLP

(57) ABSTRACT

A camera module which includes an image sensor, a three-dimensional (3D) sensor, a pre-processor, and an actuator controller. The pre-processor may be suitable for receiving image information from the image sensor, generating an auto focusing control signal based on the image information, and providing an auto focusing control signal to the actuator controller. The actuator controller may be suitable for receiving the auto focusing control signal, generating an actuator driving signal based on the auto focusing control signal, and providing the actuator driving signal to the 3D sensor. The 3D sensor may be suitable for adjusting a field of view (FOV) based on the actuator driving signal.

20 Claims, 12 Drawing Sheets

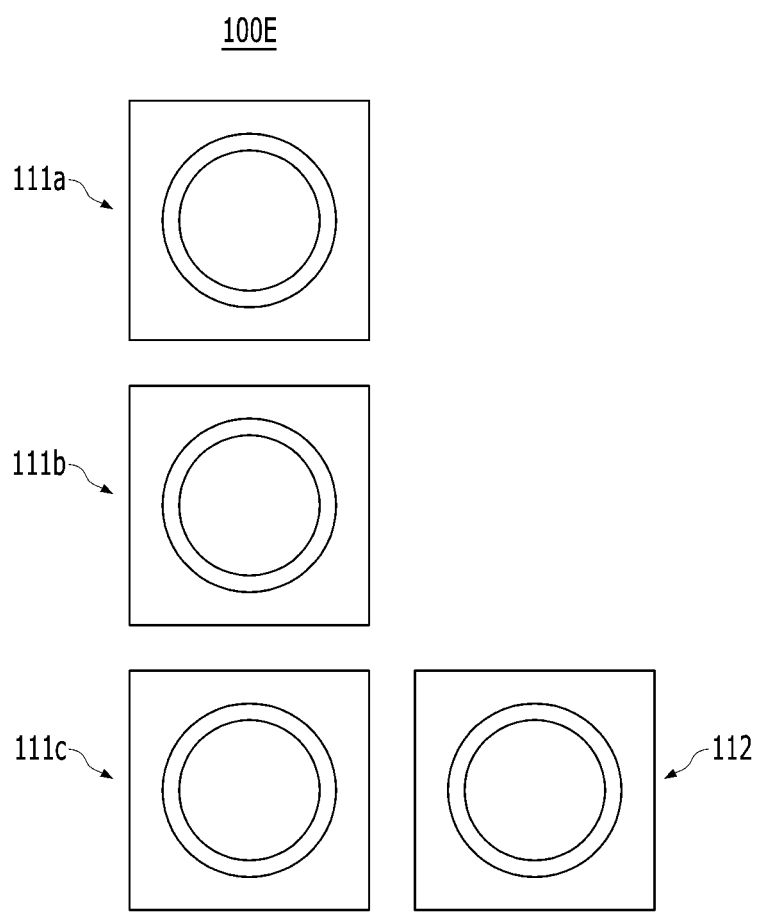

CAMERA MODULE HAVING IMAGE SENSOR AND THREE-DIMENSIONAL SENSOR

CROSS-REFERENCE TO RELATED APPLICATION(S)

This application claims priority under 35 U.S.C. § 119 to Korean Patent Application No. 10-2020-0027614, filed on Mar. 5, 2020, the disclosure of which is incorporated herein by reference in its entirety.

BACKGROUND

1. Field

Various embodiments of the present disclosure relate to a camera module having an image sensor and a three-dimensional sensor, and a camera system including the camera module.

2. Description of the Related Art

Recently, a portable camera module such as a mobile device has implemented a more stereoscopic image by additionally introducing a three-dimensional (3D) sensor. A time of flight (ToF) sensor, which is a type of 3D sensor, has received attention. The ToF sensor emits an infrared ray laser toward an object, receives a laser beam reflected from the object, and measures a time difference therebetween to obtain 3D information of the object. The maximum valid distance of the 3D information that the ToF sensor can sense is based on laser power. For example, the higher the laser power, the more accurately the ToF sensor can sense the 3D information of the object located at a long distance. However, the laser power of the 3D sensor used particularly in a mobile device cannot be sufficiently increased due to limitations of power consumption, i.e., the capability of a battery and eye safety. When a laser emission angle of the ToF sensor is decreased to increase the laser power per unit area, a field of illumination (FOI) is narrowed, and thus a valid field of view (FOV) is also narrowed. In this case, a closely located object and a large object are beyond the FOI or the FOV, and thus the entire image cannot be obtained. Conversely, when the laser emission angle of the ToF sensor is increased in order to secure a wide valid FOV, it is difficult to obtain valid 3D information because the laser power per unit area decreases, that is, the noise component increases.

SUMMARY

Various embodiments of the present disclosure are directed to a three-dimensional sensor in which a laser emission angle is adjusted according to a distance between a camera module and an object.

Various embodiments of the present disclosure are directed to a camera module having an auto focusing function and a laser emission angle adjustment function according to a distance between a camera module and an object.

Various embodiments of the present disclosure are directed to a camera module and a camera system including a three-dimensional (3D) sensor having a laser emission angle adjustment function based on an auto focusing control signal of an image sensor according to a distance between a camera module and an object.

These technical features of the present disclosure are not limited to the embodiments described above, and other technical features not described herein can be understood by those skilled in the art to which the present disclosure pertains from the following detailed description.

In accordance with an embodiment, a camera module may include: a first sensor; a second sensor; a pre-processor; and an actuator controller. The pre-processor may be suitable for receiving image information from the first sensor, generating an auto focusing control signal based on the image information, and providing an auto focusing control signal to the actuator controller. The actuator controller may be suitable for receiving the auto focusing control signal, generating an actuator driving signal based on the auto focusing control signal, and providing the actuator driving signal to the second sensor. The second sensor may be suitable for adjusting a field of view (FOV) based on the actuator driving signal.

The second sensor may include: a light source disposed on a substrate; a diffuser disposed on the light source; and an actuator. The actuator may be suitable for adjusting a distance between the light source and the diffuser based on the actuator driving signal.

The actuator may include a housing and a carrier. The carrier may support and move the diffuser.

The housing may surround the light source, the diffuser, and the carrier.

The housing may include driving coils. The carrier may include a magnet.

A number of the driving coils may be equal to or greater than three.

The diffuser may be a single layer and have a fixed laser emission angle.

In accordance with an embodiment, a camera system may include: an image sensor configured to capture image information; a three-dimensional (3D) sensor configured to obtain 3D information; a pre-processor configured to generate an auto focusing control signal based on the image information received from the image sensor; an actuator controller configured to generate an actuator driving signal based on the auto focusing control signal received from the pre-processor; an image signal processor configured to generate image data based on the image information received from the image sensor and the 3D information received from the 3D sensor; a memory unit configured to store the image data; and a display unit configured to display a visual image based on the image data. The 3D sensor may include: a light source; a diffuser; and an actuator configured to adjust a distance between the light source and the diffuser based on the actuator driving signal.

The actuator controller may generate an auto focusing driving signal and provide the auto focusing driving signal to the image sensor. The image sensor may perform an auto focusing operation based on the auto focusing driving signal.

The actuator may include a housing and a carrier. The housing may have driving coils. The carrier may have a magnet. The housing may surround the light source and the diffuser. The carrier may support and move the diffuser.

The diffuser may be a single layer and have a fixed laser emission angle.

In accordance with an embodiment, a three-dimensional (3D) sensor may include: a light source disposed on a substrate; a diffuser disposed on the light source; and an actuator. The actuator may include: a housing; and a carrier configured to support and move the diffuser.

The carrier may be configured to move the diffuser to adjust a distance between the light source and the diffuser by at least three levels.

The housing may surround the light source, the diffuser, and the carrier.

The diffuser may be spaced apart at various distances from the light source by the carrier.

The substrate may include a printed circuit board (PCB).

The light source may include a semiconductor laser diode.

The housing may include driving coils, and the carrier may include a magnet.

The driving coils may include a bottom driving coil configured to pull the carrier to a low position and a top driving coil configured to pull the carrier to a high position.

The diffuser may be a single layer and have a fixed laser emission angle.

In accordance with an embodiment, an operating method of a camera system may include: generating, through an image sensor, focused image information of an object; generating a control signal based on information of a focus on the object, information of the focus being obtained from the focused image information; generating, through a time of flight (ToF) sensor, 3D information of the object by adjusting a field of view (FOV) of the ToF sensor according to the control signal; and generating 3D image based on the focused image information and the 3D information.

Specific details of other embodiments are included in the following detailed description and drawings.

BRIEF DESCRIPTION OF THE DRAWINGS

FIGS. 2A to 2E are diagrams schematically illustrating camera modules in accordance with embodiments of the present disclosure.

DETAILED DESCRIPTION

Figure 1A:
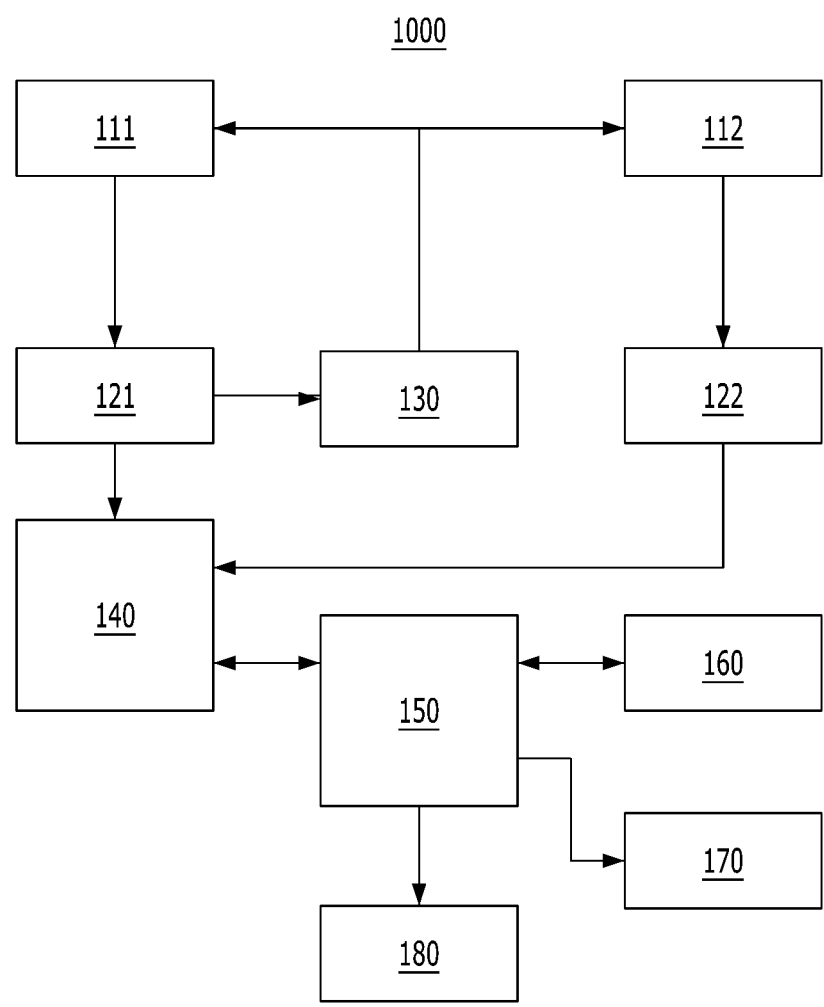
FIG. 1A is a block diagram schematically illustrating a camera system in accordance with an embodiment of the present disclosure.

FIG. 1A is a block diagram schematically illustrating a camera system 1000 in accordance with an embodiment of the present disclosure.

Referring to FIG. 1A, the camera system 1000 in accordance with the present embodiment may include a first sensor 111, a second sensor 112, a first pre-processor 121, a second pre-processor 122, an actuator controller 130, an image signal processor 140, a central processing unit 150, a memory unit 160, an audio unit 170, and a display unit 180.

The first sensor 111 may include various types of sensors, for example, an image sensor. For example, the first sensor 111 may include a CMOS image sensor. The second sensor 112 may include various types of sensors, for example, a three-dimensional (3D) sensor. For example, the second sensor 112 may include a time of flight (ToF) sensor.

The first pre-processor 121 may receive initial image information received from the first sensor 111, remove noise from the initial image information, and generate an auto focusing control signal for auto exposure and auto focusing. The auto focusing control signal may be provided to the actuator controller 130. After an auto focusing operation of the first sensor 111 is completely performed, the first pre-processor 121 may receive a valid image signal from the first sensor 111, remove noise from the valid image signal, and provide processed valid image information to the image signal processor 140.

The second pre-processor 122 may receive 3D information, remove noise from the 3D information, and provide processed 3D information to the image signal processor 140.

The actuator controller 130 may generate an auto focusing driving signal based on the auto focusing control signal received from the first pre-processor 121. The auto focusing driving signal may be provided to the first sensor 111. The first sensor 111 may perform the auto focusing operation based on the received auto focusing driving signal. For example, the first sensor 111 may perform the auto focusing operation by zooming in or out.

The actuator controller 130 may generate an actuator driving signal based on the auto focusing control signal received from the first pre-processor 121. The actuator driving signal may be provided to the second sensor 112. The second sensor 112 may perform a field of view (FOV) adjustment operation based on the actuator driving signal. The FOV adjustment operation of the second sensor 112 will be described below.

The image signal processor 140 may process the image information and the 3D information received from the first pre-processor 121 and the second pre-processor 122, respectively, and generate image data.

The central processing unit 150 may control the image signal processor 140, the memory unit 160, the audio unit 170, and the display unit 180. The central processing unit 150 may provide the image data to the memory unit 160. The memory unit 160 may store the image data. In addition, the memory unit 160 may provide the stored image data to the central processing unit 150 again. The memory unit 160 may include at least one of memory controllers, a DRAM, or a flash memory.

The audio unit 170 may include an audio controller. The audio unit 170 may output voice and sound based on the image data.

The display unit 180 may include a display controller and a display panel. The display unit 180 may display a visual image based on the image data.

Figure 1B:
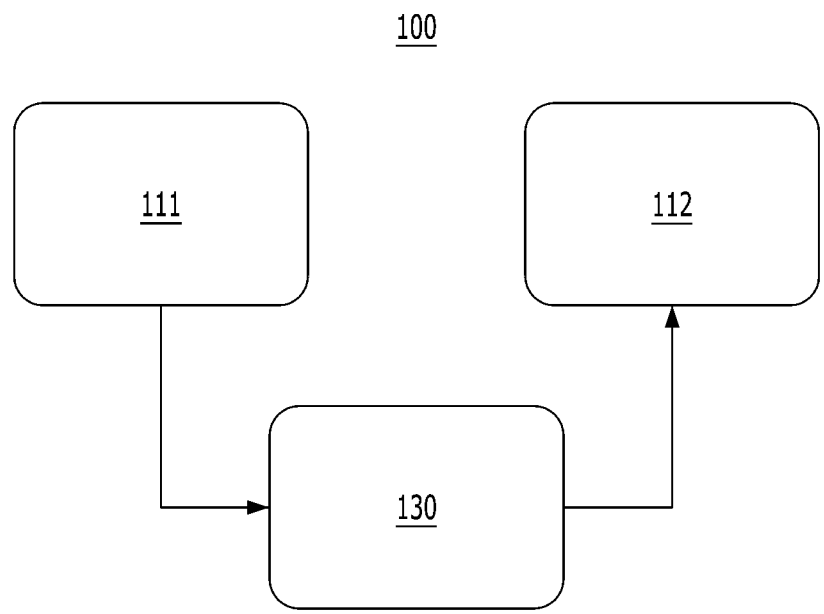
FIG. 1B is a block diagram briefly illustrating a camera module in accordance with an embodiment of the present disclosure.

FIG. 1B is a block diagram briefly illustrating a camera module 100 in accordance with an embodiment of the present disclosure.

Referring to FIG. 1B, the camera module 100 in accordance with an embodiment may include an image sensor 111, a 3D sensor 112, and an actuator controller 130. The image sensor 111 may include a CMOS image sensor, and the 3D sensor 112 may include a ToF sensor. The actuator controller 130 may receive focus information for an object from the image sensor 111 and transmit the focus information to the 3D sensor 112. A field of view (FOV) of the 3D sensor 112 may be adjusted according to the received focus information. For example, the FOV of the 3D sensor 112 may be widened or narrowed according to the focus information received from the image sensor 111.

FIGS. 2A to 2E are diagrams schematically illustrating camera modules 100A to 100E in accordance with embodiments of the present disclosure.

Figure 2A:
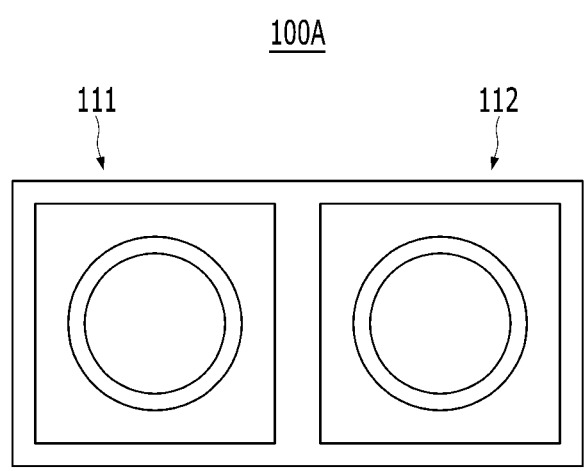

Referring to FIG. 2A, the camera module 100A in accordance with an embodiment may include an image sensor 111 and a 3D sensor 112 disposed side-by-side.

Figure 2B:
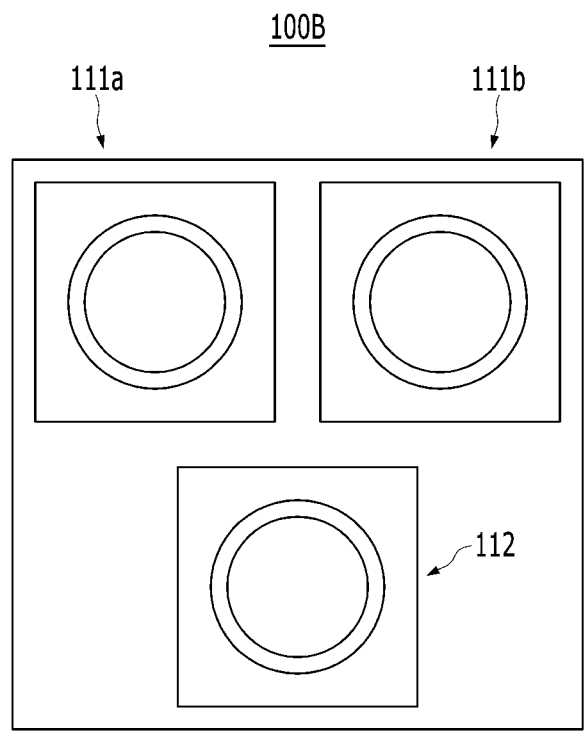

Referring to FIG. 2B, the camera module 100B in accordance with an embodiment may include two image sensors 111a and 111b and a 3D sensor 112, which are disposed side-by-side in a triangular shape. For example, the two image sensors 111a and 111b may be disposed above the 3D sensor 112. In an embodiment, the two image sensors 111a and 111b may be disposed below the 3D sensor 112.

Figure 2C:
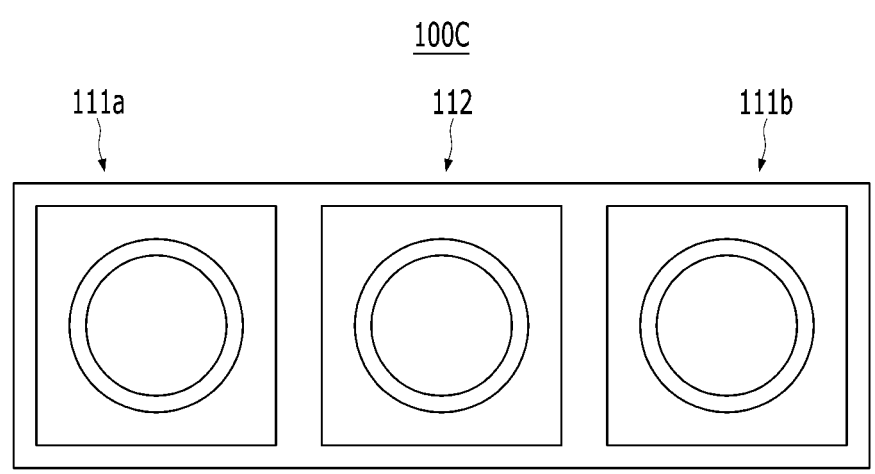

Referring to FIG. 2C, the camera module 100C in accordance with an embodiment may include two image sensors 111a and 111b and a 3D sensor 112, which are disposed side-by-side in the same direction. For example, the 3D sensor 112 may be disposed between the image sensors 111a and 111b. Although the image sensors 111a and 111b and the 3D sensor 112 are arranged side-by-side in a row direction, the image sensors 111a and 111b, and the 3D sensor 112 may also be arranged side-by-side in a column direction. For example, the image sensor 111a may be disposed above the 3D sensor 112 and the image sensor 111b may be disposed below the 3D sensor 112.

Figure 2D:
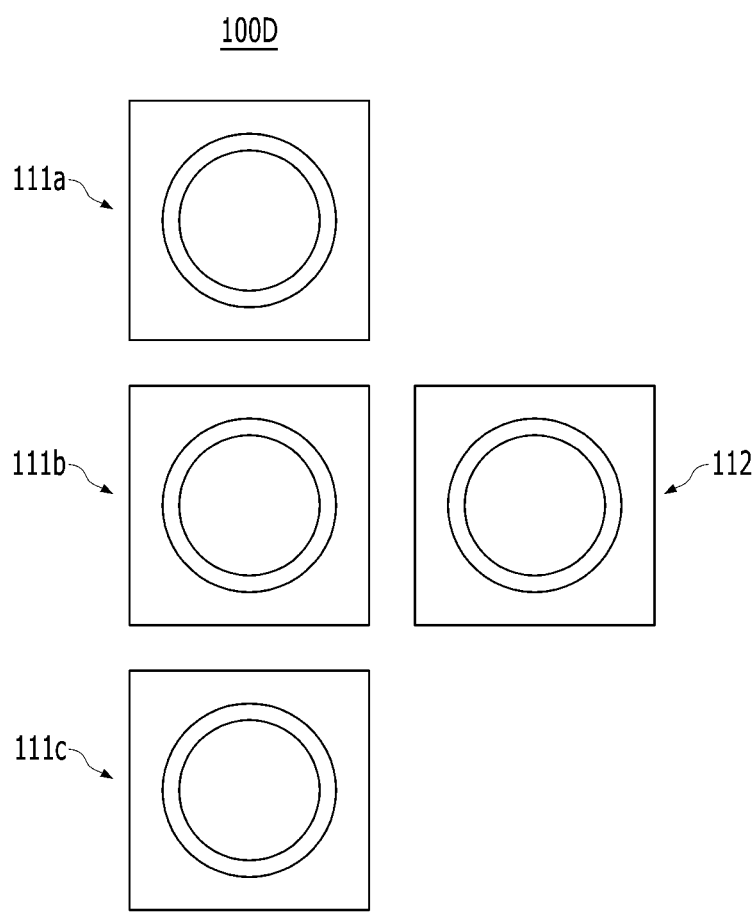

Referring to FIGS. 2D and 2E, the camera modules 100D and 100E in accordance with various embodiments may include a plurality of image sensors 111a, 111b, and 111c arranged side-by-side in a column direction, and a 3D sensor 112 arranged to be adjacent to any one of the image sensors 111a, 111b, and 111c in a row direction. For example, the image sensors 111a, 111b, and 111c and the 3D sensor 112 may be arranged in a T shape or an L shape.

In FIGS. 2B to 2E, positions of the image sensors 111a, 111b and 111c, and the 3D sensor 112 may be variously changed. In addition, according to various embodiments of the present disclosure, the camera module 100 may include four or more image sensors 111 and/or two or more 3D sensors 112.

Figure 3A:
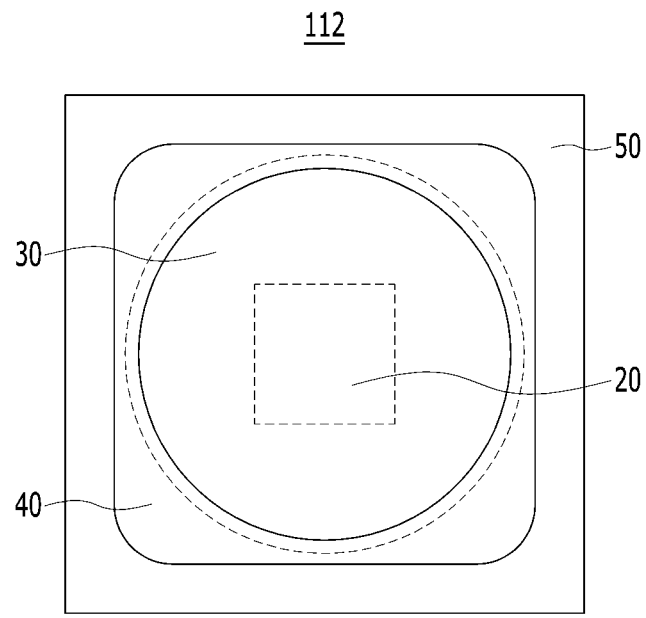
FIGS. 3A and 3B are a top view and a longitudinal-sectional diagram schematically illustrating configurations of a three-dimensional sensor in accordance with an embodiment of the present disclosure.
Figure 3B:
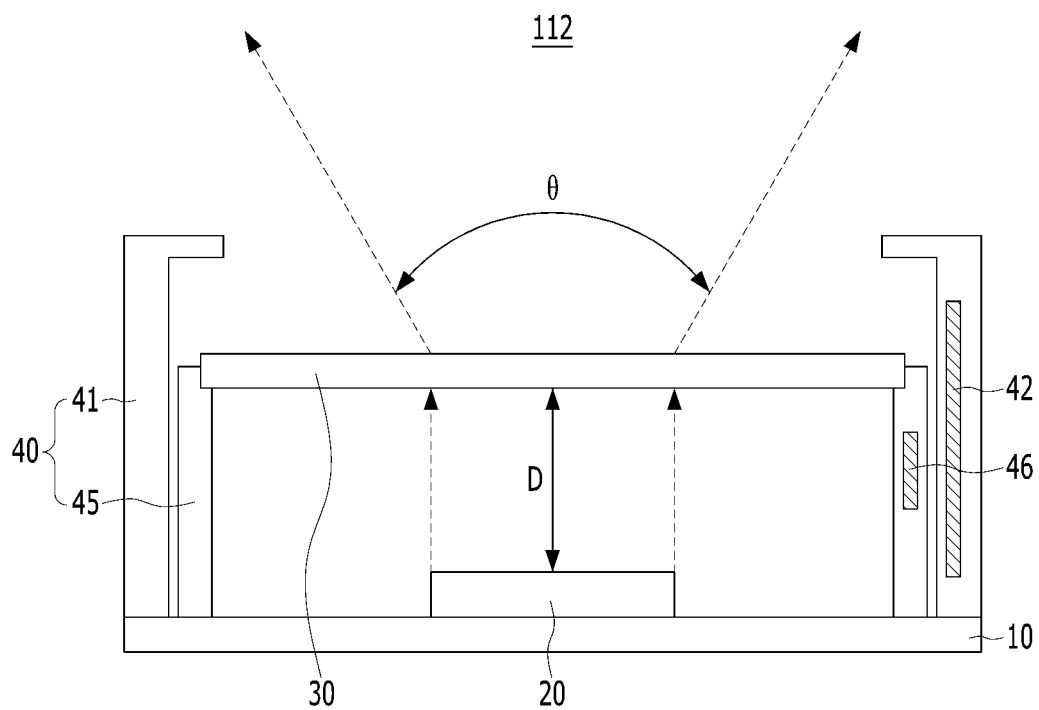

FIGS. 3A and 3B are a top view and a longitudinal-sectional diagram schematically illustrating configurations of a 3D sensor 112 in accordance with an embodiment of the present disclosure.

Referring to FIGS. 3A and 3B, the 3D sensor 112 in accordance with an embodiment may include a light source 20, a diffuser 30, and an actuator 40 mounted on a substrate 10.

The substrate 10 may include a PCB (printed circuit board), an FPCB (flexible PCB), a glass, a ceramic, or a board having electrical circuit wiring such as a silicon layer. In an embodiment, the substrate 10 may include the PCB.

The light source 20 may include a semiconductor laser diode capable of emitting a vertical cavity surface emitting laser (VCSEL).

The diffuser 30 may emit laser light, transmitted from the light source 20, to the outside. For example, the diffuser 30 may emit light at various angles of 80° to 150°. The diffuser 30 may have a fixed field of view (FOV) θ. To facilitate understanding of the present disclosure, it is assumed that a laser L emitted from the light source 20 to the diffuser 30 is straight light, although other light angles may be used. In an embodiment, the diffuser 30 may have a single layer. For example, when the diffuser 30 has a multi-layer, it is difficult to obtain appropriate 3D information due to loss of the laser L. In other words, various embodiments of the present disclosure relate to moving the single layered diffuser 30.

The actuator 40 may move the diffuser 30. For example, the actuator 40 may adjust a distance D between the light source 20 and the diffuser 30 by moving the diffuser 30 in a vertical direction.

The actuator 40 may include a housing 41 and a carrier 45. The housing 41 may surround the light source 20, the diffuser 30, and the carrier 45. The housing 41 may protect the light source 20, the diffuser 30, and the carrier 45 from external physical and chemical damage. In an embodiment, the housing 41 may include one of metals, ceramics, plastics, or polymeric resins. The housing 41 may include a driving coil 42. The carrier 45 may support and move the diffuser 30. The carrier 45 may include a magnet 46. The driving coil 42 in the housing 41 may be magnetic when a voltage is applied thereto. The magnetic driving coil 42 may pull the magnet 46, and the carrier 45 may move up and down.

Figure 4A:
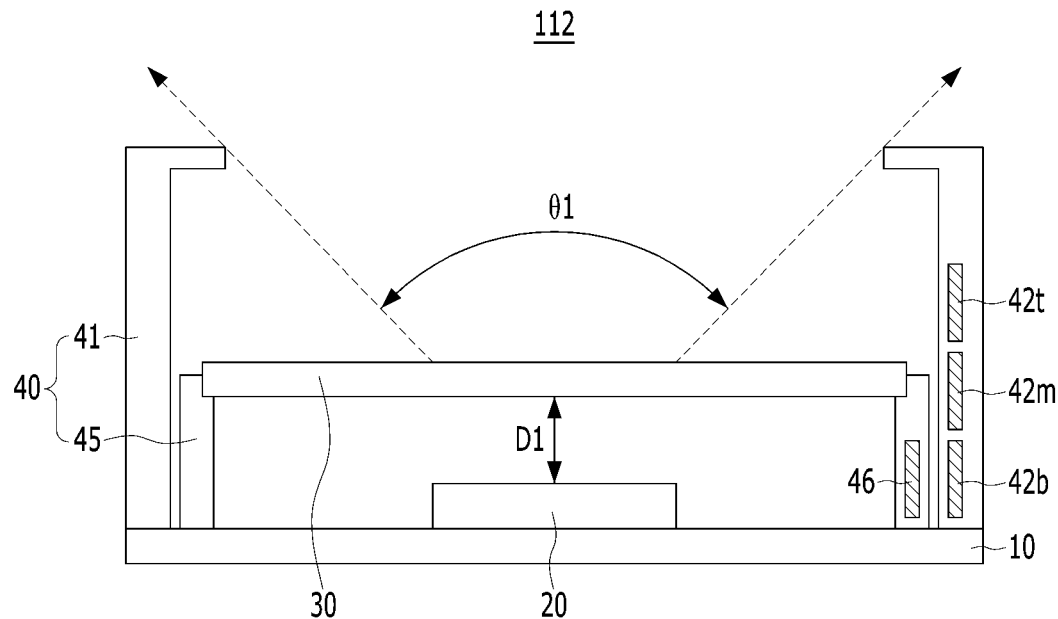
FIGS. 4A to 4C are diagrams illustrating that a carrier of a three-dimensional sensor moves up and down in multiple stages in accordance with an embodiment of the present disclosure.
Figure 4B:
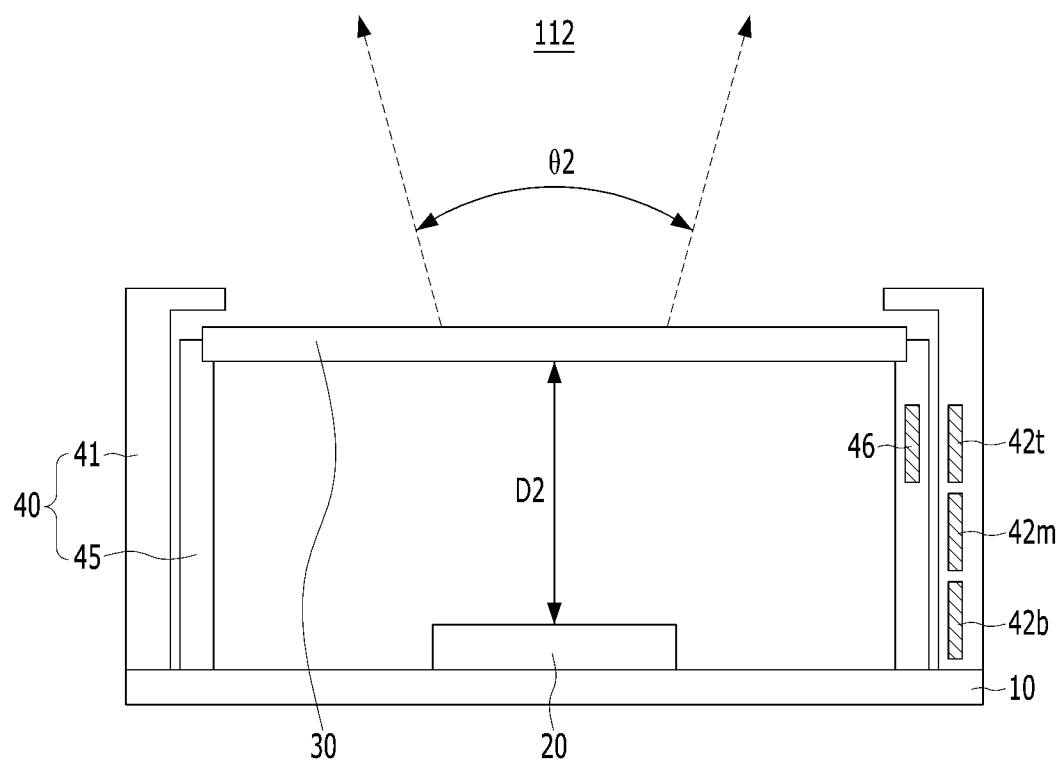
Figure 4C:
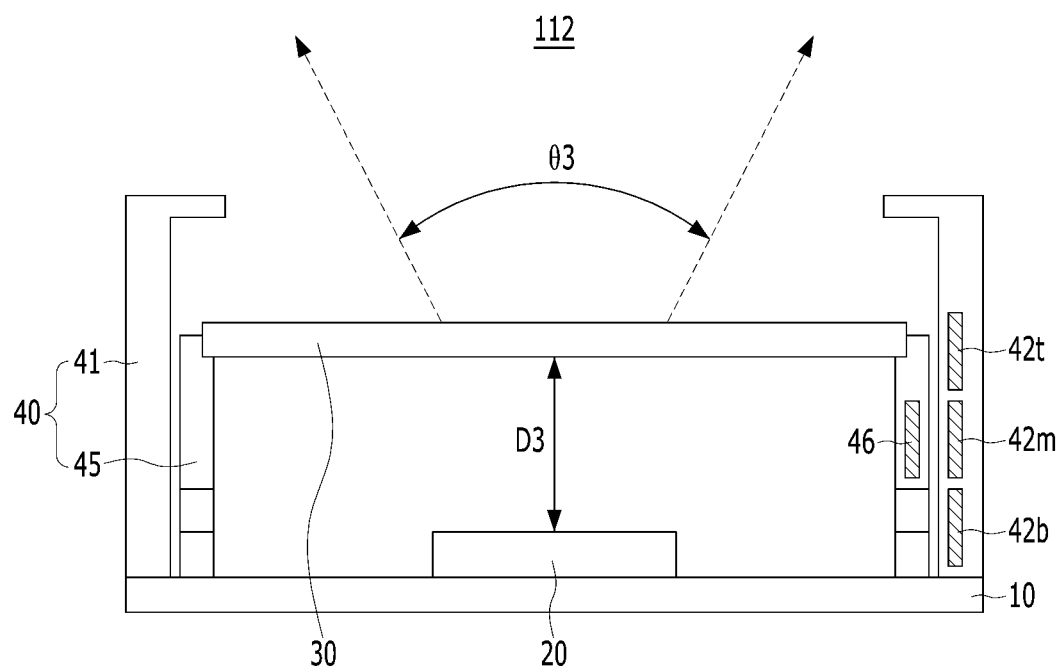

FIGS. 4A to 4C are diagrams illustrating that the carrier 45 of the 3D sensor 112 moves up and down in multiple levels in accordance with an embodiment of the present disclosure. In the present embodiment, the housing 41 may have three driving coils 42b, 42t, and 42m, and thus the carrier 45 may be positioned at three levels. In some embodiments, the actuator 40 may have a larger number of driving coils 42, 42b, 42t, and 42m.

Referring to FIG. 4A, when a distance between the 3D sensor 112 and an object is closer, the diffuser 30 may be positioned close to the light source 20. For example, when a distance between the camera module 100 and the object is short, the actuator controller 130 may provide a voltage and a current to the bottom coil 42b according to the auto focusing control signal provided by the image sensor 111. The magnet 46 may be pulled by the magnetic bottom coil 42b, and thus the diffuser 30 may be positioned at the lowest level. A first distance D1 between the light source 20 and the diffuser 30 may be a minimum distance where the diffuser 30 can be spaced apart from the light source 20. Therefore, a first FOV θ1 of the 3D sensor 112 may have a maximum angle. That is, the 3D sensor 112 may have the widest FOV θ1.

Referring to FIG. 4B, when the distance between the 3D sensor 112 and the object is far, the diffuser 30 may be positioned far from the light source 20. For example, when the distance between the camera module 100 and the object is far, the actuator controller 130 may provide a voltage and a current to the top coil 42t according to the auto focusing control signal provided by the image sensor 111. The magnet 46 may be pulled by the magnetic top coil 42t, and thus the diffuser 30 may be positioned at the highest level. A second distance D2 between the light source 20 and the diffuser 30 may be a maximum distance where the diffuser 30 can be spaced apart from the light source 20. Therefore, a second FOV θ2 of the 3D sensor 112 may have a minimum angle. That is, the 3D sensor 112 may have the narrowest FOV θ2.

Referring to FIG. 4C, when the distance between the 3D sensor 112 and the object is middle, the diffuser 30 may be positioned midway between a minimum separation distance, i.e., D1, and a maximum separation distance, i.e., D2, from the light source 20. For example, when the distance between the camera module 100 and the object is middle, the actuator controller 130 may apply a voltage and a current to the middle coil 42m based on the auto focusing control signal provided by the image sensor 111. The magnet 46 may be pulled by the magnetic middle coil 42m, and thus the diffuser 30 may be positioned at a middle level between a low level and a high level. Therefore, a third FOV θ3 of the 3D sensor 112 may have a median angle. That is, the 3D sensor 112 may have a median FOV θ3.

Figure 5A:
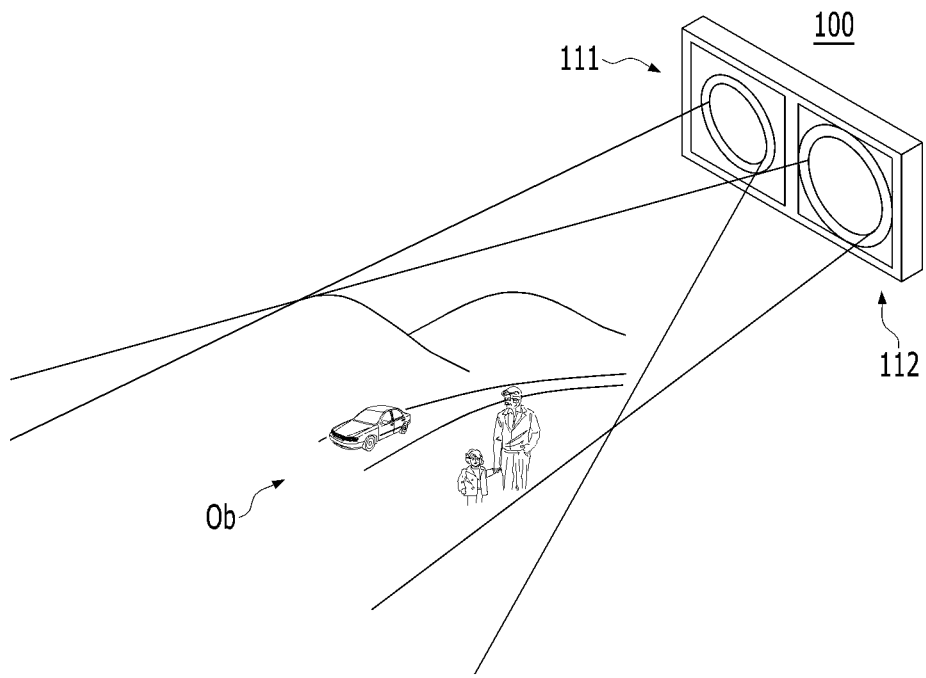
FIGS. 5A and 5B are diagrams illustrating that a field of view (FOV) of a three-dimensional sensor changes according to a distance between an object and a camera module.
Figure 5B:
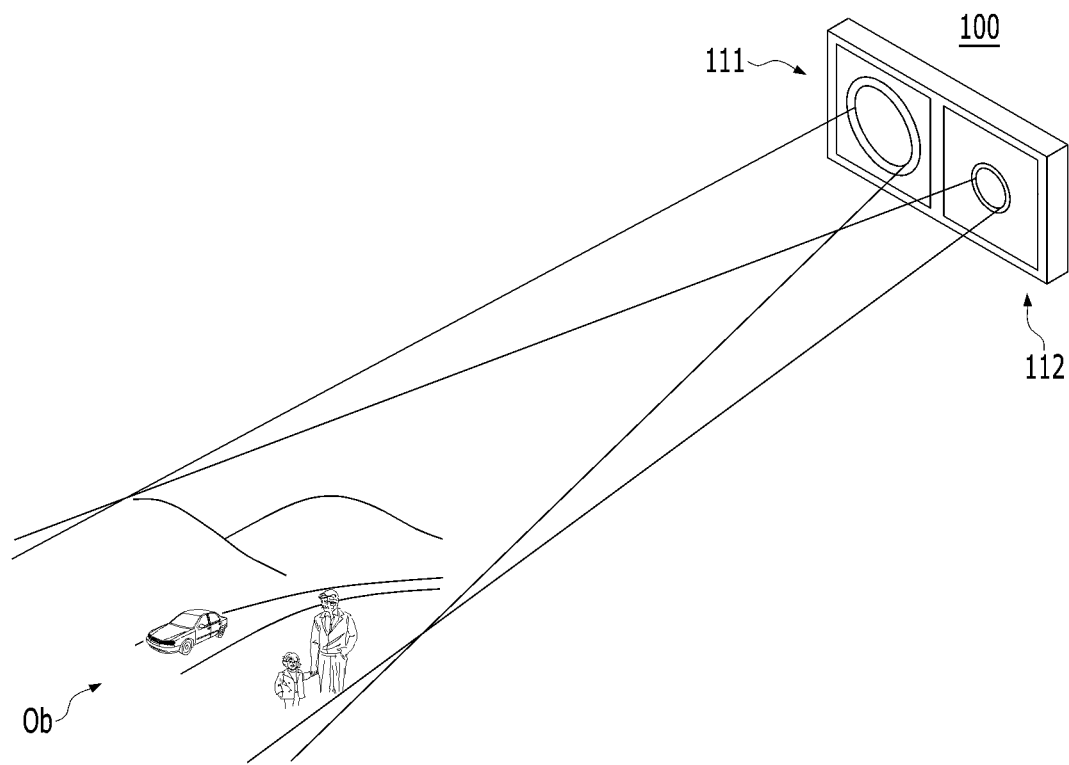

FIGS. 5A and 5B are diagrams illustrating that the FOV of the 3D sensor 112 changes according to a distance between an object Ob and the camera module 100.

Referring to FIGS. 5A and 5B, when the object Ob is relatively close to the camera module 100, that is, when the distance between the object Ob and the camera module 100 is relatively short, the 3D sensor 112 may have a relatively large FOV. When the object Ob is relatively far from the camera module 100, that is, when the distance between the object Ob and the camera module 100 is relatively long, the 3D sensor 112 may have a relatively small FOV. As described, when the distance between the object Ob and the camera module 100 is relatively short, the density of the laser emitted from the 3D sensor 112 may decrease, but the 3D sensor 112 may have a wider FOV. In addition, when the distance between the object Ob and the camera module 100 is relatively long, the FOV of the 3D sensor 112 may be narrowed, but the density of the laser emitted from the 3D sensor 112 may increase. FIGS. 5A and 5B illustrate adjusting the size of numerical aperture (NA) of the 3D sensor 112 for ease of understanding.

Figure 6A:
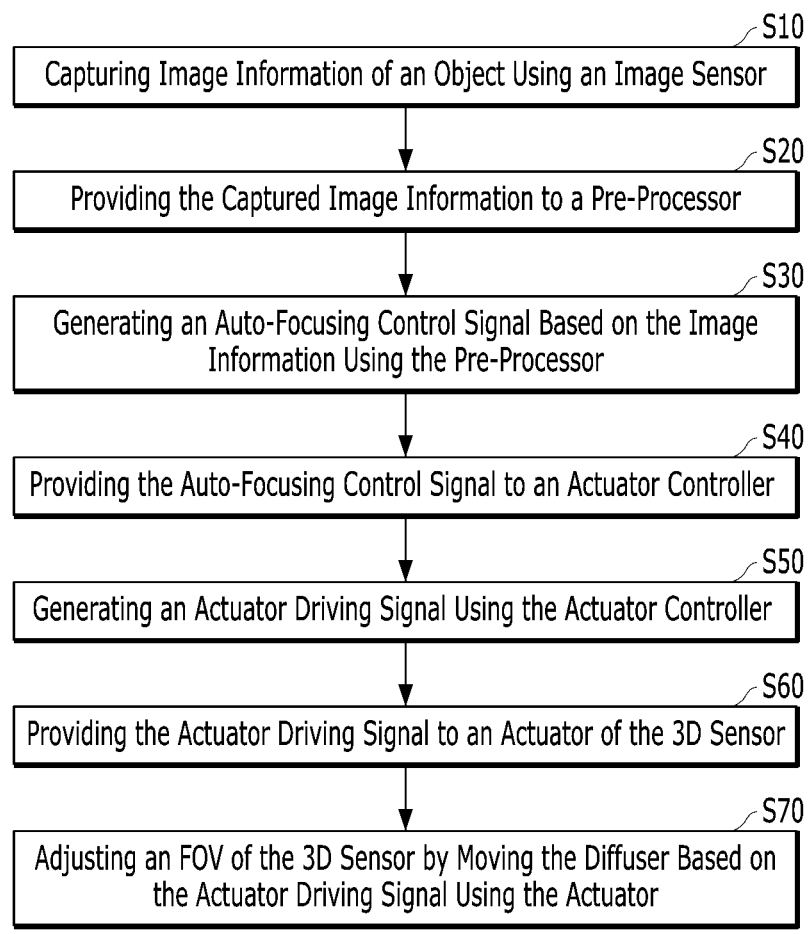
FIG. 6A is a flowchart illustrating a method of adjusting a field of view (FOV) of a three-dimensional sensor in accordance with an embodiment of the present disclosure.

FIG. 6A is a flowchart illustrating a method of adjusting the FOV of the 3D sensor 112 in accordance with an embodiment of the present disclosure.

Referring to FIGS. 1 to 6A, the method may include: capturing image information of an object using a first camera, i.e., an image sensor 111 (S10); providing the captured image information to a pre-processor 121 (S20); generating an auto focusing control signal to drive a diffuser 30 of a 3D sensor based on the image information using the pre-processor 121 (S30); providing the auto focusing control signal to an actuator controller 130 (S40); generating an actuator driving signal to drive a second camera, i.e., the diffuser 30 of the 3D sensor 112 using the actuator controller 130 (S50); providing the actuator driving signal to an actuator 40 of the 3D sensor 112 (S60); and adjusting an FOV of the 3D sensor 112 by moving the diffuser 30 based on the actuator driving signal using the actuator 40 (S70).

Figure 6B:
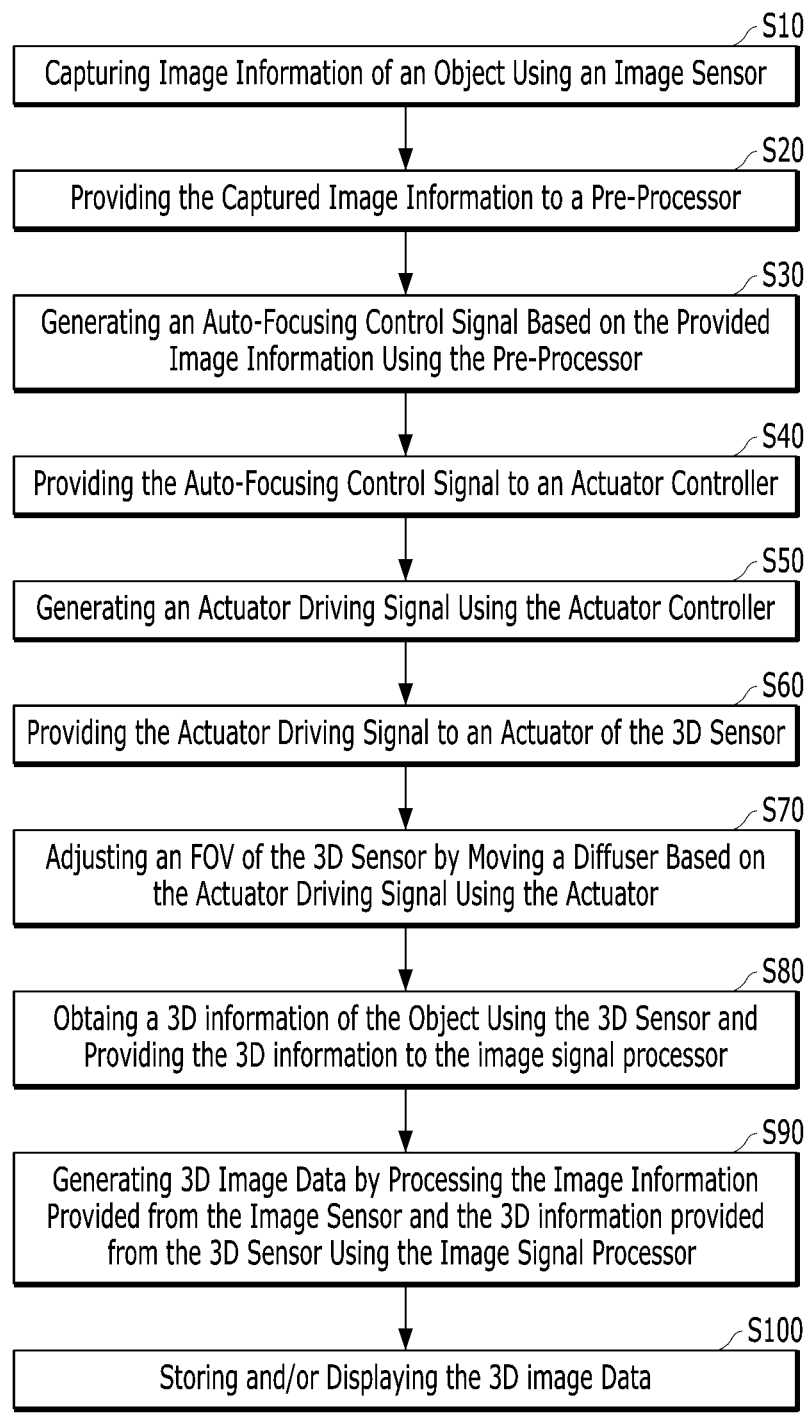
FIG. 6B is a flowchart illustrating a method of obtaining a three-dimensional image by adjusting a field of view (FOV) of a three-dimensional sensor in accordance with an embodiment of the present disclosure.

FIG. 6B is a flowchart illustrating a method of obtaining the 3D image by adjusting the FOV of the 3D sensor 112 in accordance with an embodiment of the present disclosure.

Referring to FIGS. 1 to 6B, the method may include: capturing image information of an object using a first camera, i.e., an image sensor 111 (S10); providing the captured image information to a pre-processor 121 (S20); generating an auto focusing control signal to drive a diffuser 30 of a 3D sensor based on the image information using the pre-processor 121 (S30); providing the auto focusing control signal to an actuator controller 130 (S40); generating an actuator driving signal to drive a second camera, i.e., the diffuser 30 of the 3D sensor 112 using the actuator controller 130 (S50); providing the actuator driving signal to an actuator 40 of the 3D sensor 112 (S60); adjusting an FOV of the 3D sensor 112 by moving the diffuser 30 based on the actuator driving signal using the actuator 40 (S70); obtaining 3D information of the object using the 3D sensor 112 and providing the 3D information to the image signal processor 140 (S80); generating 3D image data by processing the image information using the image sensor 111 and the 3D information provided by the 3D sensor 112 using the image signal processor 140 (S90); and storing and/or displaying the 3D image data (S100).

Figure 7:
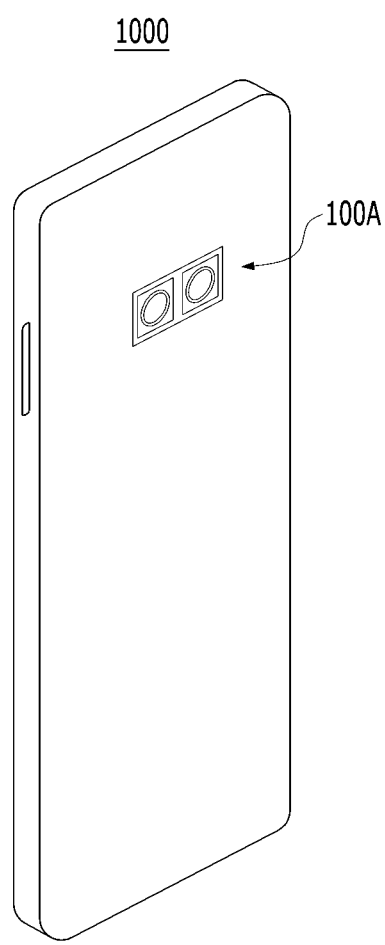
FIG. 7 is a diagram schematically illustrating various camera systems having camera modules in accordance with an embodiment of the present disclosure.

FIG. 7 is a diagram schematically illustrating a camera system 1000 having a camera module 100 in accordance with an embodiment of the present disclosure.

Referring to FIG. 7, the camera system 1000 in accordance with an embodiment may include the camera module 100 illustrated in any of the figures FIGS. 1 to 5B. In FIG. 7, the camera system 1000 is illustrated as a mobile phone as an example. According to various embodiments, the camera system 1000 may include, for example, a mobile phone, tablet computer, a digital camera, a closed-circuit TV, or other various image acquisition systems. FIG. 7 illustrates the camera module 100A illustrated in FIG. 2A. In some embodiments, the camera system 1000 may include the various camera modules 100B to 100E illustrated in FIGS. 2B to 2E. In addition, the camera module 100A may be disposed at various locations in the camera system 1000.

According to embodiments of the present disclosure, since the laser emission angle of the 3D sensor is adjusted according to the distance between the camera module and the object, appropriate 3D information can be obtained without an increase in laser power.

According to embodiments of the present disclosure, even though the distance between the camera module and the object is changed, the laser density of the 3D sensor can be kept relatively uniform.

According to embodiments of the present disclosure, the FOV of the 3D sensor can be rapidly adjusted based on focus information of the image sensor.

According to embodiments of the present disclosure, since the FOV of the 3D sensor is adjusted based on the focus information of the image sensor, the structure of the camera module can be simplified.

Embodiments of the present disclosure have been described above with reference to the accompanying drawings. However, those skilled in the art to which the present disclosure pertains will recognize that the present invention may be implemented in other specific forms, without changing its technical spirit or essential features. Thus, while the present disclosure has been illustrated and described with respect to specific embodiments, the disclosed embodiments are not intended to be restrictive.

Examples of embodiments have been disclosed herein, and although specific terms are employed, the terms are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A camera module comprising:
    an image sensor;
    a time of flight (TOF) sensor;
    a pre-processor; and
    an actuator controller,
    wherein the pre-processor is suitable for receiving image information from the image sensor, generating an auto focusing control signal based on the image information, and providing the auto focusing control signal to the actuator controller,
wherein the actuator controller is suitable for receiving the auto focusing control signal and generating an auto focusing driving signal and an actuator driving signal based on the auto focusing control signal, and
wherein the actuator controller provides the auto focusing driving signal to the image sensor and provides the actuator driving signal to the TOF sensor.

2. The camera module of claim 1,
wherein the TOF sensor includes:
a light source disposed on a substrate;
a diffuser disposed on the light source; and
an actuator that is suitable for adjusting a distance between the light source and the diffuser based on the actuator driving signal.

3. The camera module of claim 2, wherein:
the actuator includes a housing and a carrier, and
wherein the carrier supports and moves the diffuser.

4. The camera module of claim 3, wherein the housing surrounds the light source, the diffuser, and the carrier.

5. The camera module of claim 3, wherein the housing includes a driving coil, and the carrier includes a magnet.

6. The camera module of claim 5, wherein a number of the driving coils is equal to or greater than three.

7. The camera module of claim 2, wherein the diffuser is a single layer and has a fixed laser emission angle.

8. A camera system comprising:
an image sensor configured to capture image information;
a three-dimensional (3D) sensor configured to obtain 3D information;
a pre-processor configured to generate an auto focusing control signal based on the image information received from the image sensor;
an actuator controller configured to generate an actuator driving signal based on the auto focusing control signal received from the pre-processor;
an image signal processor configured to generate image data based on the image information received from the image sensor and the 3D information received from the 3D sensor;
a memory unit configured to store the image data; and
a display unit configured to display a visual image based on the image data,
wherein the 3D sensor includes:
a light source;
a diffuser; and
an actuator configured to adjust a distance between the light source and the diffuser based on the actuator driving signal,
wherein the actuator includes a housing having driving coils and a carrier having a magnet.

9. The camera system of claim 8,
wherein the actuator controller generates an auto focusing driving signal and provides the auto focusing driving signal to the image sensor, and
wherein the image sensor performs an auto focusing operation based on the auto focusing driving signal.

10. The camera system of claim 8,
wherein:
the housing surrounds the light source and the diffuser, and
the carrier supports and moves the diffuser.

11. The camera system of claim 8, wherein the diffuser is a single layer and has a fixed laser emission angle.

12. A three-dimensional (3D) sensor comprising:
a light source disposed on a substrate;
a diffuser disposed on the light source; and
an actuator,
wherein the actuator includes:
a housing; and
a carrier configured to support and move the diffuser,
wherein the housing includes driving coils, and the carrier includes a magnet.

13. The 3D sensor of claim 12, wherein the carrier is configured to move the diffuser to adjust a distance between the light source and the diffuser.

14. The 3D sensor of claim 12, wherein the housing surrounds the light source, the diffuser, and the carrier.

15. The 3D sensor of claim 12, wherein the diffuser is spaced apart from the light source by the carrier.

16. The 3D sensor of claim 12, wherein the substrate includes a printed circuit board (PCB).

17. The 3D sensor of claim 12, wherein the light source includes a semiconductor laser diode.

18. The 3D sensor of claim 12, wherein the driving coils include a bottom driving coil configured to pull the carrier to a low position and a top driving coil configured to pull the carrier to a high position.

19. The 3D sensor of claim 12, wherein the diffuser is a single layer and has a fixed laser emission angle.

20. An operating method of a camera system, the operating method comprising:
generating, through an image sensor, focused image information of an object;
generating an auto focusing driving signal and an actuator driving signal based on information of a focus on the object, information of the focus being obtained from the focused image information;
providing the auto focusing driving signal to the image sensor and the actuator driving signal to a time of flight (TOF) sensor,
adjusting a focus of the image sensor according to the auto focusing driving signal and adjusting a field of view (FOV) of the TOF sensor according to the actuator driving signal,
generating, through the time of flight (ToF) sensor, 3D information of the object; and
generating 3D image based on the focused image information and the 3D information.

* * * * *